Patented Nov. 11, 1952

2,617,737

UNITED STATES PATENT OFFICE 2,617,737

THERMOPLASTIC ARTICLES

Raphael L. Stern, South River, N. J., assignor to Hercules Powder Company, Wilmington, Del., a corporation of Delaware No Drawing. Application November 30, 1949, Serial No. 130,366

6 Claims. (Cl. 106—177)

This invention relates to tough, fire-resistant, dimensionally stable, molded thermoplastic articles, and more particularly to such articles fabricated from cellulose acetate compositions.

It has long been known that certain plasticizing materials such as triphenyl phosphate, tricresyl phosphate and tributyl phosphate impart fire resistance to cellulose acetate compositions when used in sufficient amount. However, these plasticizers exhibit disadvantages which make their use as sole plasticizing agents both undesirable and impractical. The limited compatibility and solvent power of triphenyl phosphate and tricresyl phosphate cause exudation of plasticizer from the plastic and very poor molding properties so that the molded objects made from such plastics are degraded, nonhomogeneous and exhibit unsatisfactory physical properties such as brittleness and poor dimensional stability. In order to overcome these disadvantages, it has been necessary to add supplementary plasticizers such as dimethyl phthalate, diethyl phthalate and glyceryl tripropionate which are active solvents for the cellulose acetate but which do not possess fire-resistant properties. These supplementary plasticizers must be incorporated in such high concentrations as to seriously impair or completely destroy the fire resistance imparted by the phosphate plasticizers. Tributyl phosphate, although more compatible, develops a putrid, obnoxious odor during compounding and molding which discourages its use. Consequently, molded plastic articles fabricated from prior art cellulose acetate plastics have not been satisfactory with respect to a combination of toughness, fire resistance and dimensional stability.

Now in accordance with this invention, thermally shaped plastic articles having toughness equivalent to an Izod impact value of at least 1.5 foot-pounds per inch of notch, fire resistance defined as self-extinguishing, and dimensional stability equivalent to not more than 4% loss in weight, and not more than ±3% change in any dimension in accordance with standard tests hereinafter set forth, are fabricated from compositions comprising thermoplastic cellulose acetate and plasticizer comprising sufficient organic phosphoric acid ester of the group consisting of triethyl phosphate and mixtures of triethyl phosphate with at least one other organic phosphoric acid ester so that the shaped plastic articles contain at least 6.5% by weight of phosphate radical based on the combined weight of the cellulose acetate and plasticizer, at least 20% of said phosphate radical being present in triethyl phosphate.

Plastic articles in accordance with this invention exhibit excellent toughness, fire resistance, and dimensional stability and retain these properties over extended periods of use.

The plastic articles in accordance with this invention combine toughness and dimensional stability with fire resistance regardless of the fact that triethyl phosphate because of its known physical properties does not appear to be at all attractive as a plasticizer for cellulose ester compositions to be fabricated into thermally shaped plastic articles by injection, extrusion, or compression molding methods. Triethyl phosphate has a boiling point of 216° C. and is therefore generally considered to be too volatile for use in such plastics. Furthermore, triethyl phosphate is soluble in water with decomposition. It is, therefore, indeed surprising that thermally shaped plastic articles containing triethyl phosphate in accordance with this invention have excellent toughness and dimensional stability, and retain these properties over extended periods of use.

Having described the invention in a general way, the following examples are given to illustrate specific embodiments thereof, but these are not to be construed as limiting the invention.

All parts in the following examples are parts by weight unless otherwise indicated.

EXAMPLE I

One hundred parts of cellulose acetate PL-1, 25 parts of triethyl phosphate, and 10 parts of triphenyl phosphate were premixed together in a container in the absence of volatile solvent to form a relatively uniform dry premix. This dry premix was then colloided in a heated extrusion press, and the colloided plastic mass was extruded through a hot forming die to form elongated rods which were cooled and cut into molding powder granules. The resulting molding powder was then injection molded into various suitable mold cavities to form shaped plastic articles, including various test pieces such as bars, strips and discs.

A specimen molded in the shape of a bar 5 inches long, ½-inch wide, and ½-inch thick had an Izod impact value of 2.2 foot-pounds per inch of notch (1). Molded strips 6 inches long, ½-inch wide, and ⅛-inch thick exhibited a fire resistance defined as self-extinguishing (2). A specimen molded in the shape of a disc 2 inches in diameter and ⅛-inch thick when tested for dimensional stability exhibited a loss in weight amounting to 0.58% (3). The diameter of the disc was measured in two planes at right angles to each other. The first diameter showed a maximum change of −0.70%. The second diameter measurement at right angles to the first showed a maximum change of −0.65%. The thickness of the disc showed a maximum change of +0.69% (3). The toughness, fire resistance and dimensional stability of the shaped articles were thus very satisfactory.

(1) ASTM Test #D256–47T
(2) ASTM Test #D635–44
(3) ASTM Test #D756–46T, 3 cycles of procedure 1, followed by final conditioning.

The ASTM tests for impact strength, fire resistance and dimensional stability are standard, well-known tests and do not require detailed description here, since they are published in ASTM Standards on Plastics, September 1948, by the American Society for Testing Materials, 1916 Race Street, Philadelphia 3, Pa.

Cellulose acetate PL–1 utilized in Example I is a commercially available product having a combined acetic acid content of 52–53.5% and a viscosity characteristic of less than 20 seconds, manufactured by the Hercules Powder Company.

EXAMPLES II–IV

Compositions in accordance with the formulations given in Table 1 below were prepared by the procedure given in Example I, and the resulting molding powders were then injection molded into various suitable mold cavities to form shaped plastic articles, including various test pieces such as bars, strips and discs. Molded test pieces similar to those used in Example I were tested in accordance with the standard test procedures and the test data appear in Table 1.

*Table 1*

| Example No. | II | III | IV |
|---|---|---|---|
| Ingredients: | | | |
| Cellulose Acetate PL–1 | 100 | 100 | 100. |
| Triethyl Phosphate | 32 | 15 | 15. |
| Triphenyl Phosphate | 10 | 15 | 30. |
| Dimethyl Phthalate | | 5 | 5. |
| Test Data: | | | |
| Izod Impact (foot-pounds per inch of notch) | 3.5 | 2.7 | 3.7. |
| Fire Resistance | self-extinguishing | self-extinguishing | self-extinguishing. |
| Dimensional Stability 2-inch disc, ⅛-inch thick, percent change in: | | | |
| Weight | 0.84 | 0.77 | 2.26. |
| Diameter I | −1.24 | −0.25 | −0.80. |
| Diameter II | −1.15 | −0.45 | −1.40. |
| Thickness | +0.84 | −0.16 | −0.78. |

Diameter II in the above table was at right angles to Diameter I.

The toughness, fire resistance and dimensional stability of the shaped articles of Examples II, III, and IV were thus very satisfactory.

EXAMPLES V–XII

Compositions in accordance with the formulations given in Table 2 below were prepared by mixing the ingredients of each formula together in a container with sufficient acetone to form a stiff paste. The paste was then rolled on a differential two-roll mill with the rolls heated to 150°–170° F. to completely homogenize and colloid the mixture. Rolling was continued for approximately 30–40 minutes, after which the mass formed a homogeneous, well-colloided, self-supporting sheet which could be stripped from the rolls, and a substantial portion of the acetone had been eliminated by evaporation. The plastic sheet was stripped from the mill and was broken up into molding powder granules in a knife mill. The granules were spread in a thin layer on a tray and were dried for approximately 24 hours in an air oven at 60° C. The resulting dried molding powders were then injection molded into various suitable mold cavities to form shaped plastic articles, including various test pieces such as bars, strips and discs. The shaped plastic articles from all of Examples V–XII, inclusive, possessed satisfactory toughness equivalent to Izod impact values of at least 1.5 foot-pounds per inch of notch, satisfactory fire resistance by being self-extinguishing, and satisfactory dimensional stability equivalent to not more than 4% loss in weight, and not more than ±3% change in any dimension in accordance with the standard ASTM tests set forth in Example I.

*Table 2*

| Example No. | V | VI | VII | VIII | IX | X | XI | XII |
|---|---|---|---|---|---|---|---|---|
| Ingredients: | | | | | | | | |
| Cellulose Acetate FM–6 | 100.0 | 100.0 | 100.0 | 100.0 | 100 | 100 | 100 | 100 |
| Triethyl Phosphate | 25.0 | 31.6 | 26.4 | 25.0 | 20 | 17 | 20 | 5 |
| Triphenyl Phosphate | | 15.4 | 12.5 | 10.0 | 20 | 33 | | 35 |
| Tricresyl Phosphate | | | | | | | 20 | |
| Dimethyl Phthalate | | | | | | | | 10 |

Cellulose acetate FM–6 utilized in Examples V–XII, inclusive, is a commercially available product having a combined acetic acid content of 55.5–56.2% and a viscosity characteristic of 35–55 seconds, manufactured by the Hercules Powder Company.

The thermally shaped plastic articles of this invention encompass any such article shaped or formed by any of the well-known molding processes which employ heat and pressure to shape and form them. For example, the shaped plastic articles may be sheets, rods, tubes, etc. formed by extruding the thermoplastic compositions in accordance with this invention through a hot forming die. They may be innumerable objects such as motor housings, electrically lighted ornaments, household articles, toiletry articles, toys, etc. formed by injection molding the thermoplastic compositions in accordance with this invention into suitable mold cavities by heat and pressure. Also, similar and like articles may be formed by compression molding under heat and pressure. The shaped plastic articles of this invention also embrace molding powder granules formed by hot colloiding and molding suitable compositions in accordance with this invention. For example, shaped molding powder granules formed by extruding a suitable mixture of components through a hot forming die, followed by cutting or otherwise reducing the formed shape into granules is within the scope of this invention. Hot Banbury mill or hot two-roll mill processing and colloiding, followed by sheeting and granulation are other well-known processes for preparing thermally shaped molding powder granules within the scope of this invention.

The thermally shaped plastic articles of this invention are tough, fire resistant and dimensionally stable, and possess all of these attributes as hereinafter described and defined by the appended claims.

The property of toughness contemplated by this invention is the resistance of the shaped plastic articles to breakage by sharp impact. The Izod impact strength is a reliable measure of this property of toughness and the shaped plastic articles of this invention have toughness equivalent to Izod impact strengths of at least 1.5 foot-pounds per inch of notch as measured by the standard ASTM test for impact strength set forth in Example I. Furthermore, they retain this measure of toughness over extended periods of use.

The shaped plastic articles of this invention are fire resistant to a degree defined as self-extinguishing. This means that the articles, when ignited by a flame, will not continue to propagate the flame, but will extinguish themselves when the igniting flame is removed, in accordance with the standard ASTM test for fire resistance set forth in Example I. The articles of this invention retain their self-extinguishing property throughout their useful life.

The property of dimensional stability exhibited by the plastic articles of this invention means their ability to maintain their original shape, dimensions and weight within defined limits after being subjected to adverse conditions of heat and moisture exposure. In accordance with this invention, the shaped plastic articles will show not more than 4% loss in weight, and not more than ±3% change in any dimension in accordance with the standard ASTM test for resistance of plastics to accelerated service conditions set forth in Example I. The plastic articles of this invention retain this measure of dimensional stability over extended periods of use.

By "any dimension" is meant any dimension capable of being accurately measured, such as thickness, width, length, height, depth, diameter, inside diameter, outside diameter, etc. The dimensions selected for measurement will depend somewhat on the shape and configuration of the particular article being measured. For example, the dimensions of a solid rod include diameter, circumference and length. The dimensions of a tube include wall thickness, outside diameter, inside diameter, circumference and length. The dimensions of a solid rectangular piece include width, length and thickness. Usually, it is not necessary to obtain measurements on more than two or three significant dimensions to define the dimensional stability in accordance with this invention, for if these are found to be stable within the limits defined, it has been found that other measurable dimensions are likewise stable within the limits defined by this invention.

A thermoplastic cellulose acetate is a necessary component of the thermally shaped plastic articles of this invention. Suitable cellulose acetates will have a substitution equivalent to between about 52% and about 60% combined acetic acid and a viscosity characteristic less than about 600 seconds. Cellulose acetates having a substitution equivalent to between about 52% and 57% combined acetic acid and a viscosity characteristic below about 100 seconds are preferred, however.

The amount of cellulose acetate employed will vary within relatively wide limits, depending upon the article, molding characteristics, plastic flow, and hardness desired. Usually the amount of cellulose acetate utilized will be between about 60% and 84.5% by weight of the combined weight of the cellulose acetate and plasticizer components of the plastic articles of this invention. Within the broad range of operability, the preferred amount employed will be between about 65% and 80% by weight of the combined weight of cellulose acetate and plasticizer components of the articles.

A major or substantial proportion amounting to at least about 65% by weight, and preferably all, of the plasticizer component of the plastic articles of this invention must be organic phosphoric acid ester of the group consisting of triethyl phosphate and mixtures of triethyl phosphate with at least one other organic phosphoric acid ester. Sufficient organic phosphoric acid ester of the group set forth must be present so that the articles of this invention contain at least 6.5% phosphate radical based on the combined weight of the cellulose ester and plasticizer components of the articles, and preferably 8.0% or more.

Triethyl phosphate is a necessary component in accordance with this invention, and must be present in each article in sufficient quantity to supply at least 20% of the phosphate radical present in the article. Moreover, triethyl phosphate alone is an excellent solvent plasticizer for the thermoplastic lower organic esters of cellulose, and can be employed as the sole plasticizing agent, as illustrated in Example V. It is preferable, however, to employ a mixture of triethyl phosphate with at least one other organic phosphoric acid ester, because by so doing a much greater freedom of formulation is made possible in order to meet desired plastic flow, hardness, molding conditions, etc. Any organic phosphoric acid ester may be mixed with the triethyl phosphate. Suitable esters include tripropyl phosphate, tributyl phosphate, triamyl phosphate, trihexyl phosphate, trioctyl phosphate, triphenyl phosphate, tricresyl phosphate, trixenyl phosphate, diphenylmonoxenyl phosphate, dixenylmonophenyl phosphate, tri-$\beta$-chloroethyl phosphate, methyl diphenyl phosphate, ethyl diphenyl phosphate, butyl diphenyl phosphate, cresyl diphenyl phosphate, etc. The proportions of triethyl phosphate and other organic phosphoric acid ester within such mixtures may be varied within wide limits to obtain a suitable plastic flow, hardness, molding characteristics, etc., the only limitations being with respect to the total phosphate radical which must be present and the amount of this radical which must be supplied by triethyl phosphate. Within the broad operable range, preferred mixtures comprise between about 10% and 25% by weight of triethyl phosphate and between about 5% and 25% by weight of triphenyl phosphate, based on the combined weight of the cellulose acetate and phosphoric plasticizers. It has been further found that when the proportion of triethyl phosphate is between about 10% and about 25% by weight and the proportion of triphenyl phosphate is between about 5% and about 15%, based on the combined weight of the cellulose acetate and phosphoric plasticizer, the shaped plastic articles of this invention are remarkably resistant to plasticizer exudation under adverse conditions of exposure. For example, shaped articles formulated within these limits for the triethyl phosphate and triphenyl phosphate components do not exude plasticizer even after 60 hours of exposure at 140° F. and 88% relative humidity.

A minor proportion amounting to not more than about 35% by weight of the total plasticizer component of the articles of this invention may be supplemental plasticizers such as dimethyl phthalate, diethyl phthalate, methylphthalyl ethyl glycolate, glyceryl tripropionate, etc. Such plasticizers, although excellent solvents for cellulose acetate must be utilized in limited qauntities, as defined, in order not to substantially impair the fire resistance of the shaped plastic articles of this invention. Preferably the supplemental plasticizer should constitute not more than about 25% by weight of the total plasticizer component.

The plastic articles of this invention may contain various auxiliary components such as pigments, dyes, fillers, lubricants, waxes, etc., usually in minor amounts, to impart desired properties such as color, waterproofness, easy mold release, etc.

Other methods of compounding well known in the plastics art may be employed instead of the hot extrusion method employed in Examples I–IV, and the solvent process employed in Examples V–XII. For example, the cellulose acetate and plasticizer components together with auxiliary materials may be mixed and colloided on a hot two-roll mill or in a hot Banbury mill in the absence of volatile solvent and the resulting colloided mass shaped by subsequent hot molding operations.

Since the plastic articles of this invention are characterized by being tough, dimensionally stable and self-extinguishing, they are therefore particularly suitable for many industrial, home and personal uses. They are especially suitable for uses where industrial, insurance or safety requirements make it necessary or desirable to employ plastic articles which are self-extinguishing and will not propagate a fire, and which additionally must be tough and dimensionally stable in order to successfully perform their useful function. Typical uses include such things as various electrical appliances including motor housings, electrically lighted Christmas tree ornaments, vacuum cleaner housings, electrically driven tool handles, electrically powered deodorant dispensers, toiletry articles, toys, etc.

The viscosity characteristic of the cellulose acetate materials of this invention expresses the time of fall of a $\frac{5}{16}$-inch steel ball through 10 inches of a 20% solution (by weight) of the cellulose acetate dissolved in a solvent composed of 90:10 acetone : ethyl alcohol (by weight), confined in a 1-inch inside diameter glass tube, at 25° C.

What I claim and desire to protect by Letters Patent is:

1. Thermally shaped plastic articles comprising between about 60% and 84.5% of thermoplastic cellulose acetate and between about 40% and 15.5% of plasticizer, each based on the combined weight of cellulose acetate and plasticizer, at least 65% of said plasticizer consisting of a mixture of triethyl phosphate and at least one triaryl phosphoric acid ester, said triaryl phosphoric acid ester constituting at least 5% of the combined weight of cellulose acetate and plasticizer, the mixture of phosphate plasticizers being proportioned so that the shaped plastic articles contain at least 6.5% by weight of phosphate radical based on the combined weight of cellulose acetate and plasticizer, at least 20% of said phosphate radical being present in said triethyl phosphate, said articles characterized by toughness equivalent to an Izod impact value of at least 1.5 foot-pounds per inch of notch, fire resistance defined as self-extinguishing, and dimensional stability equivalent to not more than 4% loss in weight, and not more than ±3% change in any dimension.

2. Thermally shaped plastic articles in accordance with claim 1 in which the triaryl phosphoric acid ester is triphenyl phosphate.

3. Thermally shaped plastic articles in accordance with claim 1 in which the triaryl phosphoric acid ester is tricresyl phosphate.

4. Thermally shaped plastic articles in accordance with claim 1 in which the triaryl phosphoric acid ester is cresyl diphenyl phosphate.

5. Thermally shaped plastic articles comprising between about 65–80% cellulose acetate having a combined acetic acid content between about 52% and 57% and a viscosity characteristic of less than about 100 seconds, 10–25% triethyl phosphate, and 5–25% triphenyl phosphate; said articles characterized by toughness equivalent to an Izod impact value of at least 1.5 foot-pounds per inch of notch, fire resistance defined as self-extinguishing, and dimensional stability equivalent to not more than 4% loss in weight, and not more than ±3% change in any dimension.

6. Thermally shaped plastic arcticles comprising between about 65–80% cellulose acetate having a combined acetic acid content between about 52% and 57% and a viscosity characteristic of less than about 100 seconds, 10–25% triethyl phosphate, and 5–15% triphenyl phosphate; said articles characterized by toughness equivalent to an Izod impact value of at least 1.5 foot-pounds per inch of notch, fire resistance defined as self-extinguishing, dimensional stability equivalent to not more than 4% loss in weight, and not more than ±3% change in any dimension, and freedom from plasticizer exudation after 60 hours of exposure at 140° F. and 88% relative humidity.

RAPHAEL L. STERN.

REFERENCES CITED

The following references are of record in the file of this patent:

UNITED STATES PATENTS

| Number | Name | Date |
|---|---|---|
| 1,981,132 | Walsh | Nov. 20, 1934 |
| 2,021,901 | Smith | Nov. 26, 1935 |
| 2,328,269 | Gloor | Aug. 31, 1943 |

OTHER REFERENCES

Handbook Plastics—Simonds et al.—1943—pgs. 260, 261, 270 and 271.